United States Patent [19]

Berry

[11] Patent Number: 5,332,243
[45] Date of Patent: Jul. 26, 1994

[54] LOAD CARRYING CRADLE WITH SEPARABLE WHEEL ASSEMBLIES

[76] Inventor: Alexander J. Berry, 7020 Millcreek, Shawnee, Kans. 66217

[21] Appl. No.: 988,740

[22] Filed: Dec. 10, 1992

[51] Int. Cl.⁵ .................... B62B 1/00; B62B 5/00
[52] U.S. Cl. ........................... 280/35; 280/63;
 280/47.131; 280/79.7
[58] Field of Search ............ 280/35, 42, 63, 79.7,
 280/652, 659, 43.1, 43.11, 43.13, 47.131, 47.24;
 269/17, 905

[56] References Cited

U.S. PATENT DOCUMENTS

| | | | |
|---|---|---|---|
| 1,035,293 | 8/1912 | Wyatt | 280/35 X |
| 2,450,690 | 10/1948 | Robins | 280/43.1 X |
| 2,579,448 | 12/1951 | Carrera | 280/47.131 X |
| 2,662,777 | 12/1953 | Wilchek | 280/47.24 |
| 2,708,119 | 5/1955 | Best | 280/43.1 X |
| 2,763,491 | 9/1956 | Thorwaldson | 280/35 |
| 3,066,946 | 12/1962 | Nelson | 280/35 X |
| 3,717,357 | 2/1973 | Schaefer | 280/35 |
| 3,884,491 | 5/1975 | Hughart | 280/35 |
| 4,386,767 | 6/1983 | Dyckes et al. | 269/905 X |
| 4,398,736 | 8/1983 | De Wijn | 280/652 X |

OTHER PUBLICATIONS

Panel Skate, Sales brochure from Shopcarts in San Francisco, Calif., Pub. date unknown.

Primary Examiner—Brian L. Johnson
Attorney, Agent, or Firm—Litman, McMahon & Brown

[57] ABSTRACT

A load carrying cradle includes a pair of wheel assemblies, each of which accommodates a bicycle-type wheel rotatable therein. Each wheel assembly includes a pair of horizontal slots, one of which is positioned in front of the wheel with the other positioned behind the wheel. A pair of lengths of standard-size framing lumber are slidably positioned within the horizontal slots with the lumber extending between the wheel assemblies to form a load platform. The wheel assemblies are movable toward and away from each other on the lumber to accommodate various sizes of loads. Each wheel assembly also includes a pair of vertically oriented slots to accommodate a corresponding optional pair of vertically oriented pieces of lumber. The vertically oriented lumber allows the cradle to carry and support taller loads than would be possible with the wheel assemblies alone. The horizontally oriented slots are positioned substantially below the axis of rotation of the wheels for enhanced stability and the cradle has a turning radius equal to the spacing between the two wheels. When the cradle is disassembled, it can be conveniently stored.

25 Claims, 2 Drawing Sheets

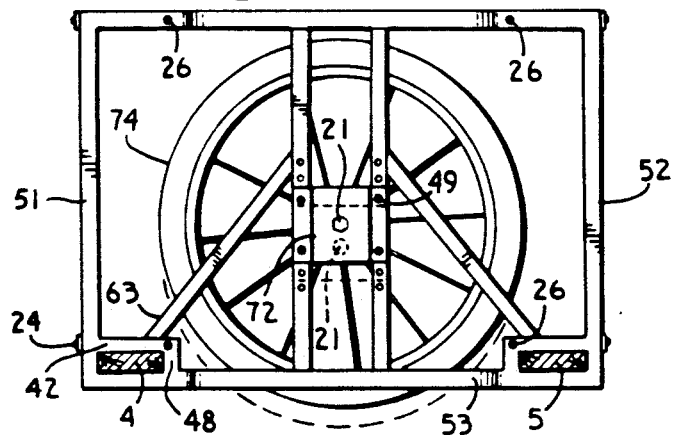
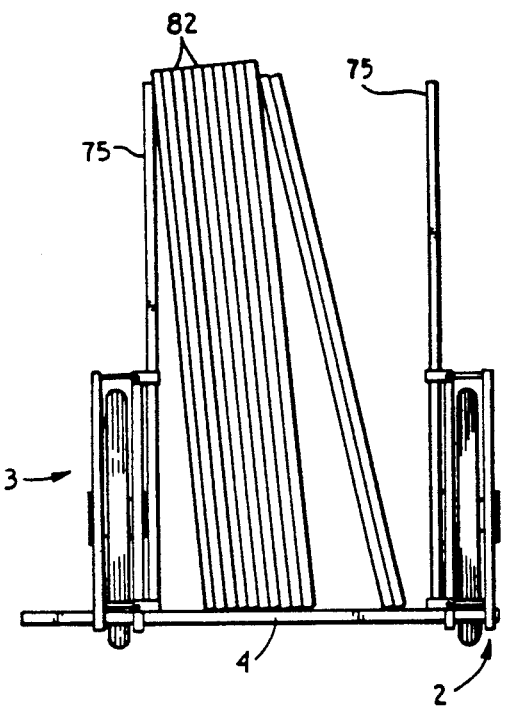
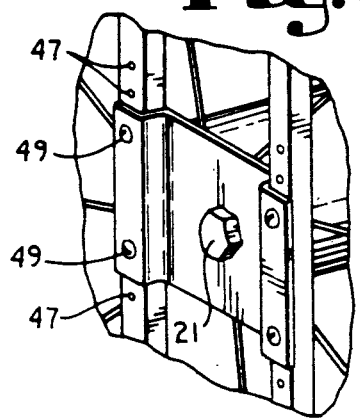
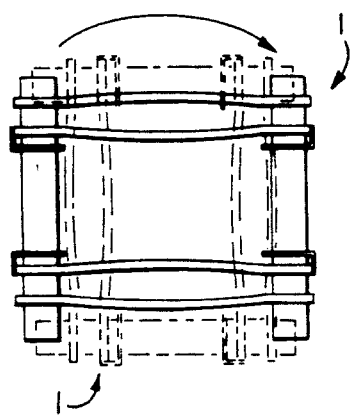
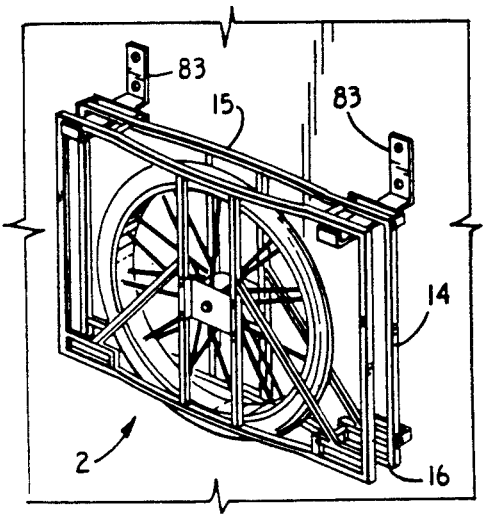

LOAD CARRYING CRADLE WITH SEPARABLE WHEEL ASSEMBLIES

BACKGROUND OF THE INVENTION

1. Field of the Invention

This invention is directed to a load carrying cradle for carrying objects which are too heavy and/or too awkward for a person to carry, and more particularly to such a cradle with a pair of wheel assemblies which are slidably movable toward and away from each other along a pair of load supports to accommodate objects of widely varying sizes.

2. Description of the Related Art

The convenient transportation of heavy and/or bulky objects by a single person has long presented a challenge to designers of personal load carrying conveyances. Of course, an almost universally used vehicle for such occasions is a standard, single-wheeled wheelbarrow. While presenting a number of advantages, such as convenient storage and maneuverability, wheelbarrows also present a number of difficulties. The nature of the single-wheeled design renders a wheelbarrow inherently unstable. A person pushing a wheelbarrow must exert considerable energy in holding up the handles to partially support the combined weight of the load and of the wheelbarrow itself. Furthermore, the requirement for the person pushing the wheelbarrow to stand directly behind the single wheel renders it virtually impossible to carry objects of substantial length or bulk.

Prior efforts at overcoming these shortcomings have included various two, three and four wheeled designs. Two wheeled carts with an elevated bed, a rear handle and a fixed rear support leg or legs are one popular approach. Such carts often use bicycle wheels for better obstacle clearance and rough ground handling. While representing a substantial improvement over single-wheeled wheelbarrows in stability and in the lifting effort required of a user, the rear-mounted handle arrangement still makes it difficult to carry lengthy objects. Furthermore, heavy objects must be initially lifted onto the elevated cart bed before being transported, and the bulky two-wheeled carts take up an inordinate amount of storage space.

Another popular load carrying vehicle is a four-wheeled dolly of the type often used in self-service lumber yards and the like. Such dollies have a low platform, which requires minimal lifting of heavy objects, and widely spaced frame supports which permit bulky objects to be carried. However, these dollies tend to be constructed of heavy gauge steel, making the dollies themselves extremely heavy, and the small free castering wheels require a smooth, firm surface for their operation. Furthermore, the fixed spacing of the frame supports means that tall, thin objects, such as doors, gates, fence sections, etc. are not adequately supported and tend to topple over. The four-wheeled dollies generally take up even more storage space than a two-wheeled cart, and are not near as maneuverable.

It is clear then, that a need exists for a convenient and versatile load carrying cradle which is capable of carrying bulky and heavy objects. Such a cradle should be stable and relatively light, easily maneuverable, and should preferably use bicycle-type wheels for ease of operation over rough surfaces. The cradle should have a low load carrying platform requiring minimal lifting of heavy objects and yielding a low combined center of gravity for increased stability, and should have upright load support frames which are adjustable to provide adequate support even for tall, thin objects such as doors, etc. The cradle should be capable of turning in a small radius and, when not in use, the cradle should be capable of convenient disassembly so that it can be easily stored.

SUMMARY OF THE INVENTION

In the practice of the present invention, a load carrying cradle comprises a pair of load supporting upright wheel assemblies, each of which includes a bicycle-type wheel freely rotatable therein. Each of the wheel assemblies has a pair of horizontally oriented slots, one of which is positioned in front of and the other of which is positioned behind the wheel. The horizontal slots are positioned well below the axis of rotation of the wheels. Each of the wheel assemblies also includes a pair of vertically oriented slots, one of which is positioned alongside of and above each of the horizontally oriented slots. Each of the horizontally oriented and vertically oriented slots is sized and designed to accommodate a board of standard-sized framing lumber, such as a "1×4" for example. A single one of the boards is slidably placed through each corresponding horizontally oriented slot on both of the wheel assemblies, with one board placed in front of both wheels and another board placed behind both wheels. The wheel assemblies can thus be slid toward and away from each along the horizontally oriented boards to accommodate a wide plurality of widths of transported objects. The horizontally oriented boards thus form the load carrying platform of the cradle. The cradle has a turning radius equal to the spacing between the two wheels. Each of the vertically oriented slots can optionally accommodate a vertically oriented board which can extend upward above the wheel assemblies, allowing the cradle to accommodate and adequately support taller objects than are possible with the wheel assemblies alone. The net result is a versatile and light-weight cradle capable of carrying a wide variety of heavy, long and bulky objects with enhanced stability and maneuverability, and one which can be disassembled and conveniently stored by removing the framing boards.

OBJECTS AND ADVANTAGES OF THE INVENTION

The principle objects and advantages of the present invention include: to provide an improved load carrying cradle; to provide such a cradle with a pair of wheel assemblies, each of which includes a rotatable bicycle-type wheel therein; to provide such a cradle in which the wheel assemblies each include a pair of horizontally oriented slots, one slot positioned in front of and one slot positioned behind the wheel, with each slot sized to accommodate a horizontally oriented board of standard-sized framing lumber; to provide such a cradle in which the horizontal board provides a load supporting surface; to provide such a cradle in which the wheel assemblies are movable toward and away from each other along the horizontal board to accommodate loads of various sizes; to provide such a cradle which includes a number of vertically oriented slots sized to accommodate optional vertically oriented boards of standard-sized framing lumber to allow the cradle to carry and support taller objects than could be supported by the wheel assemblies alone; to provide such a cradle which has a turning radius equal to the spacing between the wheels; to provide such a cradle with a load supporting platform positioned substantially below the axis of rotation of the wheels for enhanced stability; to provide such a cradle which can be conveniently disassembled and stored in a compact storage space; and to provide a cradle which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a cross-sectional view of the cradle, taken along line 4—4 of FIG. 2, and showing an elevated wheel position in solid lines and a lowered wheel position in phantom lines.

FIG. 5 is a front elevational view of the cradle, showing a number of plywood sheets being transported, and with the wheel assemblies separated sufficiently to accommodate the sheets of plywood.

FIG. 6 is an enlarged and fragmentary view of a wheel height adjustment apparatus on the cradle.

FIG. 7 is a reduced, partially schematic, top plan view of the cradle, showing the cradle in solid lines in a first position, and in phantom lines in a second position to illustrate the turning radius of the cradle.

FIG. 8 is a perspective view of a single one of the wheel assemblies, with the cradle disassembled, illustrating the compact storage possibilities of the cradle.

DETAILED DESCRIPTION OF THE INVENTION

I. Introduction and Environment

Figure 1:
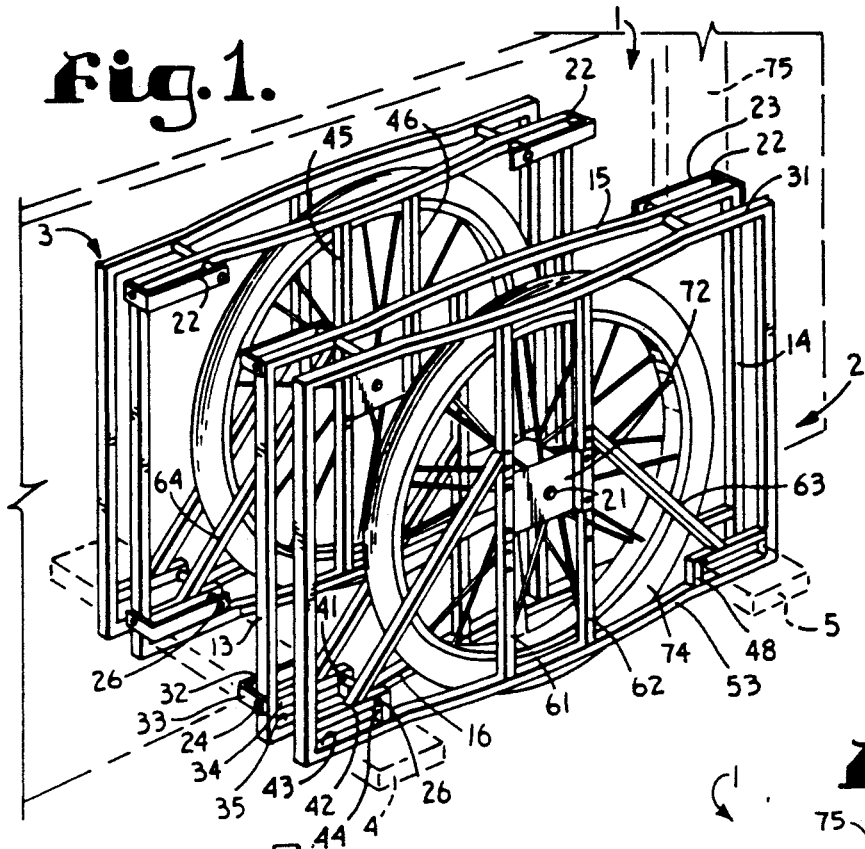
FIG. 1 is a perspective view of a load carrying cradle in accordance with the present invention, showing the framing lumber supports in phantom lines.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail the reference numeral 1 in FIG. 1 generally designates a load carrying cradle in accordance with the present invention. The cradle 1 comprises a pair of wheel assemblies 2 and 3, which are connected by a pair of boards 4 and 5, shown in phantom lines in FIG. 1. The wheel assemblies 2 and 3 are identical, therefore only assembly 2 will be described in detail.

II. Wheel Assemblies

Figure 3:
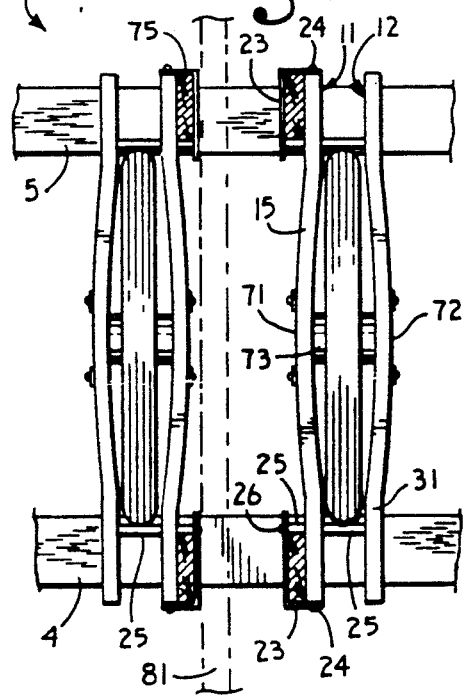
FIG. 3 is a fragmentary cross-sectional view of the cradle, taken along line 3—3 of FIG. 2, with the door shown in phantom lines.

The wheel assembly 2 comprises an inner rectangular frame 11 and an outer rectangular frame 12. The inner frame 11 comprises a pair of upright side frame members 13 and 14, and a top and a bottom frame member 15 and 16, respectively. Each of the top and the bottom frame members 15 and 16 have a bowed portion in the center thereof to accommodate a wheel 74. Two vertically oriented top slots 22 are positioned on the top two corners of the inner frame 11. Referring to FIG. 3, each of the slot members 22 comprises an L-shaped strap 23 with the free end of the short leg of the L bolted to the end of respective side frame member 13 or 14 via a short bolt 24. The free end of the long leg of the L is bolted to a respective one of a pair of spacing sleeves 25, each of which extends through the top frame member 15, and to a respective top frame member 31 of the outer rectangular frame 12. A long bolt 26 holds the long leg of the L strap 23 in position on each sleeve 25, and extends through the sleeve 25 to the top frame member 31, to connect the top corners of the inner and outer frames 11 and 12 to each other.

A pair of vertically oriented bottom slot members 32 are constructed in much the same fashion. Each of the bottom slot members 32 comprise an L shaped strap 33 with the short leg bolted to a respective side frame member 13 or 14 via a bolt 24. The long leg is bolted to a short horizontal top member 34 of a respective one of a pair of horizontally oriented slots 35, via a spacing sleeve 41. As described above, the spacing sleeves 41 extend through the top members 34 and to matching top members 42 in horizontally oriented slots 43 in the outer frame 12. A pair of the long bolts 26 extend through the sleeves 41 to both connect the strap 33 to the top member 34 and to connect the slot top members 41 and 42 together as well.

Each of the horizontally oriented slots 35 in the inner frame 11 is formed from one of the horizontal top members 34, a short vertically oriented side member 44, and portions of the bottom frame member 16 and a respective side frame member 15 or 16. A pair of vertical axle support members 45 and 46 extend between the top frame member 15 and the bottom frame member 16. Each of the vertical axle supports 45 and 46 includes a number of adjustment bores 47 drilled therethrough.

The outer frame 12 is similarly constructed of a pair of upright side frame members 51 and 52, the top frame member 31 and a bottom frame member 53. As in the inner frame 11, the top and bottom frame members 31 and 53, respectively, of the outer frame 12 are bowed in the center to accommodate the wheel 74. The pair of horizontally oriented slots 43 are aligned with the slots 35 in the inner frame 11. Each slot 43 is formed by one of the horizontal top members 42, a vertical member 48, and portions of the bottom frame member 53 and a portion of a respective one of the side frame members 51 or 52. A further pair of vertical axle support members 61 and 62 extend between the top frame member 31 and the bottom frame member 53. Each of the vertical axle supports 61 and 62 also includes a number of the adjustment bores 47 drilled therethrough. An angled brace member 63 extends between each of the slot top members 42 and a respective one of the axle supports 61 and 62. A similar pair of angled brace members 64 are similarly placed in the inner frame 11.

An axle support plate 71 is attached to the vertical axle supports 45 and 46 on the inner frame 11 and a matching axle support plate 72 is attached to the axle supports 61 and 62 in the outer frame 12. Each axle plate 71 and 72 is adjustable vertically via the adjustment bores 47. The axle 21 extends between the support plates 71 and 72, and a hub 73 of a bicycle type wheel 74 is connected to the axle 21.

III. Cradle Assembly and Disassembly

Figure 2:
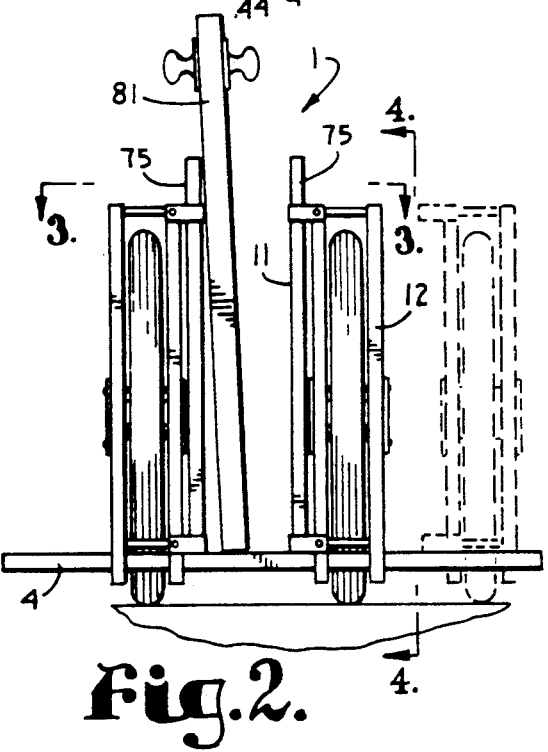
FIG. 2 is a front elevational view of the cradle, showing a door being transported, and with one of the wheel assemblies shown in both solid and phantom lines at two different respective positions.

The load carrying cradle 1 is assembled by placing the load carrying boards 4 and 5 through the horizontally oriented slots 43 and 35 in the outer and inner frames 12 and 11, respectively, of each of the wheel assemblies 2 and 3. Next, an optional plurality of vertically extending boards 75 are placed in each of the vertically oriented slots 22 in the inner frames 11. As illustrated in FIG. 2, where the wheel assembly 2 is shown in phantom lines in a first, relatively widely spaced position and in solid lines in a more closely spaced position, the wheel assemblies 2 and 3 are readily adjustable toward and away from each other along the boards 4 and 5.

Of course, the cradle 1 is easily disassembled after use by removing the boards 4, 5 and 75. Once disassembled, the wheel assemblies 2 and 3 can be stored separately from the boards, and, as shown in FIG. 8, the wheel assemblies 2 and 3 can be stored in a relatively small wall space.

IV. Operation

Once the cradle 1 is assembled by placing the boards 4, 5, and 75 in their respective slots, the wheel assemblies 2 and 3 are positioned along the boards 4 and 5 a distance commensurate with the load to be carried. In FIGS. 2 and 3, for example, a single door 81 is being carried so the wheel assemblies 2 and 3 are spaced just wide enough so that the door 81 can be easily loaded and unloaded. In FIG. 5, by contrast, a number of sheets of plywood 82 are being carried, so the wheel assemblies 2 and 3 are more widely spaced to accommodate the wider load. The vertical boards 75 in FIG. 5 are made correspondingly longer to provide better support for the taller load.

Referring to FIG. 7, the cradle 1 is shown in a first position in solid lines and in a second position, approximately ninety degrees from the first position, in phantom lines. With the narrow aspect wheels, the turning radius of the cradle 1 is equal to the spacing between the wheels 74. Of course, the length of any load, such as the door 81 or the plywood sheets 82, as well as the length of the boards 4 and 5, must be considered when maneuvering a loaded cradle 1.

It should be noted that the horizontal slots 35 and 43 in each of the wheel assemblies 2 and 3 are positioned substantially below the axis of rotation of the wheels 74. Thus, the center of gravity of the combination of the cradle 1 and the load, such as the door 81 or the plywood 82, for example, is considerably lower than most carts or dollies. This arrangement greatly increases the stability of the cradle 1. The axles 21 can be raised and lowered via the adjustment bores 47 to provide some flexibility in loading. Referring to FIG. 4, the axle 21, the plate 72, and the wheel 74 are shown in a raised position in solid lines and in a lowered position in phantom lines. The use of large diameter, narrow aspect bicycle type wheels presents minimal rolling friction and the low effective center of gravity of the cradle 1 and any associated load allows the cradle 1 to be operated over relatively rough surfaces and minor obstructions, such as construction debris, with relative ease. By lowering the axles 21, enhanced ground clearance can be provided for the boards 4 and 5 and the bottom frame members 16 and 53.

The cradle 1 has been illustrated as using ordinary framing lumber boards 4, 5 and 75 for supporting surfaces. In the illustrated embodiment, 1×4's are shown, however, the respective slots can be sized for any desired size of board. Alternatively, stronger materials, such as steel plates, fiberglass planks, etc. can be used in place of the boards 4, 5, and 75 if desired, for heavier loads.

It is to be understood that while certain forms of the present invention have been illustrated and described herein, it is not to be limited to the specific forms or arrangement of parts described and shown.

What is claimed and desired to be secured by Letters Patent is as follows:

1. A load carrying cradle comprising:
   (a) a pair of wheel assemblies, each of which includes a framework with a pair of generally rectangular frames with an axle extending between said rectangular frames, a wheel rotatably mounted to said axle and positioned between said rectangular frames, said frames being of a height which substantially encompasses the diameter of said wheel and being of a length which is greater than said wheel diameter and a pair of horizontally oriented slots, one positioned on either side of said wheel, each of said horizontally oriented slots including an opening which extends completely through each of said rectangular frames and thus through the respective wheel assembly from side to side in a direction parallel to the rotational axis of said wheel; and
   (b) a pair of elongate load supports removably and slidably attached to and extending completely through the openings in corresponding respective horizontally oriented slots in both of said wheel assemblies, such that each said load support extends completely through each and continuously between said wheel assemblies whereby said wheel assemblies are movable toward and away from each other along said load supports.

2. A cradle as in claim 1, wherein:
   (a) each of said horizontally oriented slots is positioned substantially below the center of rotation of said wheels.

3. A cradle as in claim 1, wherein:
   (a) each of said supports comprises a board of standard-sized framing lumber.

4. A cradle as in claim 1, wherein:
   (a) each of said wheel assemblies comprises at least one vertically oriented slot to accommodate an upright load support member.

5. A cradle as in claim 4, wherein:

(a) each of said upright load support members comprises a board of standard-sized framing lumber.

6. A cradle as in claim 5, wherein:
(a) each said wheel assembly comprises a pair of said vertically oriented slots.

7. A cradle as in claim 1, wherein:
(a) each of said wheels is a bicycle-type wheel.

8. A cradle as in claim 1, wherein:
(a) each of said wheel assemblies includes means for adjusting said axles vertically relative to said horizontally oriented slots.

9. A cradle as in claim 1, wherein:
(a) said cradle can be easily disassembled by removing said support members form said wheel assemblies.

10. A cradle as in claim 1, wherein:
(a) said cradle has a turning radius equal to a spacing between said wheels.

11. A load carrying cradle comprising:
(a) a pair of wheel assemblies, each of which includes a framework with a pair of generally rectangular frames with an axle extending between said rectangular frames, a bicycle-type wheel rotatably mounted to said axle and positioned between said rectangular frames, said frames being of a height which substantially encompasses the diameter of said wheel and being of a length which is greater than said wheel diameter, each wheel assembly comprising a pair of horizontally oriented slots, each of said horizontally oriented slots including an opening which extends completely through each of said rectangular frames and thus through the respective wheel assembly from side to side in a direction parallel to the rotational axis of said wheel, and at least one vertically oriented slot to accommodate an upright load support member; and
(b) a pair of elongate horizontal load support members, each of said load support members being removably and slidably attached to and extending completely through the openings in corresponding respective horizontally oriented slots in both of said wheel assemblies such that each said load support member extends completely through each and continuously between said wheel assemblies whereby said wheel assemblies are movable toward and away from each other along said pair of load support members.

12. A cradle as in claim 11, wherein:
(a) one of said pair of horizontally oriented slots in each of said wheel assemblies is positioned in front of said wheel with the other of said horizontally oriented slots positioned behind said wheel.

13. A cradle as in claim 12, wherein:
(a) each of said horizontally oriented slots is positioned substantially below the center of rotation of said wheels.

14. A cradle as in claim 12, wherein:
(a) each of said support members comprises a length of standard-sized framing lumber.

15. A cradle as in claim 11, wherein:
(a) each of said upright load support members comprises a length of standard-sized framing lumber.

16. A cradle as in claim 15, wherein:
(a) each said wheel assembly comprises a pair of said vertically oriented slots.

17. A cradle as in claim 11, wherein:
(a) each of said wheel assemblies includes means for adjusting said axles vertically relative to said horizontally oriented slots.

18. A cradle as in claim 11, wherein:
(a) said cradle can be easily disassembled by removing said support members form said wheel assemblies.

19. A cradle as in claim 11, wherein:
(a) said cradle has a turning radius equal to a spacing between said wheels.

20. A load carrying cradle comprising:
(a) a pair of wheel assemblies, each of which includes a pair of interconnected generally rectangular frames with an axle extending therebetween, a bicycle-type wheel rotatably mounted on said axle and positioned between said rectangular frames, said frames being of a height which substantially encompasses the diameter of said wheel and being of a length which is greater than said wheel diameter, each assembly comprising a pair of horizontally oriented slots, each of said horizontally oriented slots including an opening which extends completely through both interconnected frames and thus through the respective wheel assembly from side to side in a direction parallel to the rotational axis of said wheel, with one of said pair of horizontally oriented slots on each of said wheel assemblies positioned in front of said wheel and the other of said horizontally oriented slots position behind said wheel, with each of said horizontally oriented slots positioned substantially below the axis of rotation of said wheels, and at least one vertically oriented slot to accommodate an upright load support member; and
(b) a pair of elongate load support members, each of which is slidably and removably placed within and extending completely through the openings in corresponding horizontally oriented slots of both of said wheel assemblies such that each said elongate load support member extends completely through each and continuously between said wheel assemblies with said wheel assemblies being slidably adjustable toward and away from each other along said elongate load support members.

21. A cradle in claim 20, comprising:
(a) a pair of said vertically oriented slots in each of said wheel assemblies; and
(b) each of said upright load support members comprises a board of standard-sized framing lumber.

22. A cradle as in claim 20, wherein:
(a) each of said wheel assemblies includes means for adjusting said axles vertically relative to said horizontally oriented slots.

23. A cradle as in claim 20, wherein:
(a) said cradle can be easily disassembled by removing said boards form sad wheel assemblies.

24. A cradle as in claim 20, wherein:
(a) said cradle has a turning radius equal to a spacing between said wheels.

25. A wheel assembly for a load carrying cradle, said assembly comprising:
(a) a pair of interconnected, generally rectangular frames with an axle connected therebetween, a bicycle-type wheel positioned between said frames and being rotatably mounted on said axle, each of said frames having a height which substantially encompasses the diameter of said wheel and a length which is greater than said wheel diameter;

(b) a pair of horizontally oriented slots, one of said slots positioned in front of and one of said slots positioned behind said wheel, each of said horizontally oriented slots including an opening which extends through each of said frames and thus completely through the wheel assembly from side to side in a direction parallel to the rotational axis of said wheel, each said opening being sized and positioned to removably accommodate a horizontal load support extending completely through said opening.

* * * * *